US009854407B2

(12) United States Patent
Zimmermann (10) Patent No.: US 9,854,407 B2
(45) Date of Patent: Dec. 26, 2017

(54) METHOD AND DEVICES FOR MONITORING THE POSITION OR MODIFYING THE POSITION OF AN OBJECT

(71) Applicant: Bayerische Motoren Werke Aktiengesellschaft, Munich (DE)

(72) Inventor: Sebastian Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/153,398

(22) Filed: May 12, 2016

(65) Prior Publication Data

US 2016/0261990 A1    Sep. 8, 2016

Related U.S. Application Data

(63) Continuation of application No. PCT/EP2014/073208, filed on Oct. 29, 2014.

(30) Foreign Application Priority Data

Nov. 13, 2013  (DE) .................. 10 2013 223 104

(51) Int. Cl.
*H04W 24/00* (2009.01)
*H04W 4/02* (2009.01)
(Continued)

(52) U.S. Cl.
CPC .......... *H04W 4/028* (2013.01); *H04W 4/023* (2013.01); *H04W 4/046* (2013.01); *H04W 64/00* (2013.01);
(Continued)

(58) Field of Classification Search
USPC .......... 455/456.1; 340/936; 701/41, 117, 50
See application file for complete search history.

(56) References Cited

U.S. PATENT DOCUMENTS 8,229,473 B1    7/2012  De La Rue
2008/0252487 A1  10/2008  McClellan et al.
(Continued)

FOREIGN PATENT DOCUMENTS

DE    10 2006 000 744 A1    7/2007
DE    60 2004 011 587 T2    1/2009
(Continued)

OTHER PUBLICATIONS

International Search Report (PCT/ISA/210) issued in PCT Application No. PCT/EP2014/073208 dated May 28, 2015 with English translation (eight pages).
(Continued)

*Primary Examiner* — David Q Nguyen
(74) *Attorney, Agent, or Firm* — Crowell & Moring LLP (57) ABSTRACT

A method and apparatus for the technical monitoring of objects, in particular of vehicles, by a mobile radio network is provided. The method for operating a mobile radio network having one or a plurality of mobile radio base stations for monitoring the object includes a first network access device for the mobile radio network communicating with at least one of mobile radio base station, including the acts of receiving first data from the first network access device via the at least one mobile radio base station, detecting a physical position or a change of physical position of the object based on the first data, checking whether the detected position or position change meets a predetermined criterion, and, if the predetermined criterion is met, outputting a predetermined signal.

15 Claims, 3 Drawing Sheets

(51) Int. Cl.
*H04W 64/00* (2009.01)
*H04W 4/04* (2009.01)
*H04W 88/02* (2009.01)
*H04W 88/08* (2009.01)

(52) U.S. Cl.
CPC .......... *H04W 64/006* (2013.01); *H04W 88/02* (2013.01); *H04W 88/08* (2013.01)

(56) References Cited

U.S. PATENT DOCUMENTS

| | | | |
|---|---|---|---|
| 2011/0148609 A1 | 6/2011 | Dabholkar et al. | |
| 2014/0324300 A1* | 10/2014 | Halder | G01S 19/49 701/50 |
| 2016/0068158 A1* | 3/2016 | Elwart | B60W 10/00 701/41 |
| 2016/0189544 A1* | 6/2016 | Ricci | G07C 5/008 701/117 |

FOREIGN PATENT DOCUMENTS

| | | |
|---|---|---|
| DE | 10 2009 029 748 A1 | 12/2010 |
| DE | 11 2010 004 937 T5 | 12/2012 |
| EP | 1 136 792 A2 | 9/2001 |
| EP | 1 522 981 A2 | 4/2005 |
| EP | 1 484 731 B1 | 9/2006 |
| EP | 2 012 480 A1 | 7/2009 |

OTHER PUBLICATIONS

German-language Written Opinion (PCT/ISA/237) issued in PCT Application No. PCT/EP2014/073208 dated May 28, 2015 (six pages).
German Search Report issued in counterpart German Application No. 10 2013 223 104.0 dated Jan. 23, 2014 with partial English translation (nine pages).
Walke, "Mobilfunketze and ihre Protokolle", Band 1, B.G. Teubner Stuttgart 1998, eight pages, with partial machine translation.

* cited by examiner

METHOD AND DEVICES FOR MONITORING THE POSITION OR MODIFYING THE POSITION OF AN OBJECT

CROSS REFERENCE TO RELATED APPLICATIONS

This application is a continuation of PCT International Application No. PCT/EP2014/073208, filed Oct. 29, 2014, which claims priority under 35 U.S.C. §119 from German Patent Application No. 10 2013 223 104.0, filed Nov. 13, 2013, the entire disclosures of which are herein expressly incorporated by reference.

BACKGROUND AND SUMMARY OF THE INVENTION

The present invention relates to the technical monitoring of objects, particularly of vehicles, by a mobile radio network.

The prior art discloses the practice of monitoring objects, particularly motor vehicles, for their physical position using technical tools. In this case, an aim of the monitoring may particularly be to identify unforeseen movements by the object, for example in the event of a theft, in order to be able to react thereto if need be. Other known fields of application relate to the detection of vehicle positions for the purpose of location, particularly as part of fleet management, for example for fleets of rental cars, buses or trucks, or detection for the purpose of toll collection.

In this context, the position finding is effected in many cases using satellite-assisted position finding systems, particularly using the global positioning system GPS. In addition, there are also further satellite-assisted position finding systems, such as the European "Galileo" system, for example, which is currently under development. Besides these, it is also known practice to detect changes of position of a vehicle using wheel sensors.

Modern motor vehicles are furthermore capable of using a key radio system to identify the approach of a key belonging to the vehicle in the vicinity of the vehicle by a corresponding key radio signal and also of reacting thereto, for example by unlocking a locking installation of the vehicle.

Furthermore, it is known that vehicles, particularly motor vehicles, may be equipped with a network access device that can be used to set up a communication link to a radio network, particularly to a mobile radio network. The most commonplace mobile radio networks include what are known as cellular mobile radio networks, particularly based on one of the known mobile radio standards GSM, GPRS, EDGE, 3G and LTE. Cellular mobile radio networks of this kind have at least one, but normally a multiplicity of, what are known as mobile radio base stations. In this case, a communication link from a network access device to the mobile radio network is set up by a radio link between the network access device and at least one of these mobile radio base stations. In this case, the mobile radio base stations are connected to further components of the mobile radio network, particularly to what is known as the core network, and also normally to one another and to other communication networks, particularly to the conventional land-based landline telephone network (PSTN), by communication links, which do not need to be radio-based, however.

Thus, the European patent no. EP 1 484 731 B 1 discloses a vehicle locating system for stolen vehicles that contain a communication unit but also have a GPS receiver. In this case, the GPS receiver is used to detect the position of the vehicle, which is transmitted by the communication unit of the vehicle via a radio network to a processing center, which is not itself part of the radio network, but uses the position information to assess whether the position of the vehicle has changed. If this is case, then a notification signal can be transmitted to a predetermined mobile telephone or a computer of the vehicle owner, or the present position of the vehicle can be shown on a map.

Against this background, the invention is based on the object of further improving the technical monitoring of objects, particularly of vehicles.

A first aspect of the invention relates to a method for operating a mobile radio network having one or more mobile radio base stations for monitoring an object, particularly a vehicle, that has a first network access device for the mobile radio network, which network access device has a communication link to at least one of the mobile radio base stations. In this case, the method comprises the following steps:

(S1a) receiving first data from the first network access device by the at least one mobile radio base station and (S2a) detecting a physical position or of a physical change of position of the object on the basis of the first data;

(S3) checking of the detected position or change of position to determine whether it satisfies a predetermined criterion; and (S4) if this is the case, outputting a predetermined signal.

In this case, at least one of steps (S2a) and (S3) is carried out by the at least one mobile radio base station.

An "object" within the context of the invention is intended to be understood to mean any article that is equipped such that it can establish a communication link to a mobile radio network, in particular to a cellular network. Mobile telephones, computers, tablet computers and radio transponders, and vehicles that are equipped such that they can register in such a, are themselves objects within the context of the invention.

A "vehicle" within the context of the invention is intended to be understood to mean a mobile means of transport for transporting people or articles, which transport may be particularly a land vehicle, a water vehicle or an aircraft. In this case, a vehicle can have any drive, particularly an internal combustion engine or an electric drive, without this being a requirement, however. Inter alia, automobiles, trucks, motorcycles and buses and also trailers therefor are each vehicles within the context of the invention.

A "communication link" within the context of the invention is intended to be understood to mean any type of connection for data or information transmission that can involve (useful) information being transmitted from a sender (information source) to a receiver (information sink). To this end, the sender varies a physical magnitude (for example a voltage or the frequency of electromagnetic waves) over time and said physical magnitude is detected and measured by the receiver. A data transmission link may be particularly in the form of a terrestrial radio link (particularly via a mobile radio network) or a satellite radio link. In particular, the data transmission link may, regardless of the chosen physical transmission technology, be a data transmission link that is provided by the Internet. In the case of a communication link between a network access device and at least one mobile radio base station of a cellular mobile radio network, the communication link already exists even if the network access device is only registered in the mobile radio network, without requiring active voice or useful data transmission (particularly if the network access device is in an "IDLE" mode). In particular, even a connection for transmitting control data via a control channel between a network access device and a mobile radio base station, which is defined on what is known as the physical layer of a mobile radio protocol stack, for example, is a "communication link" within the context of the invention.

A "network access device" (NAD) within the context of the invention is intended to be understood to mean a subscriber unit, particularly an electronic circuit, that can be used to set up a communication link between a subscriber device, particularly a subscriber terminal, and a communication network, particularly a mobile radio network. Inter alia, mobile telephones and mobile radio modems (in particular mobile station "MS" or user equipment "UE" according to the relevant definitions in the mobile radio standards specified by 3GPP) and also other wireless access points for a communication network are network access devices within the context of the invention.

A "physical position" or "physical change of position" of an object, particularly of a vehicle, within the context of the invention is intended to be understood to mean the position of the object in space or the change of said position. In particular, the physical position may be defined or determined relative to the earth's surface, as is the case for the purposes of satellite navigation by GPS, with or without assistance by data from a map, for example.

A "mobile radio base station" within the context of the invention is intended to be understood to mean a base station in a, in particular cellular, mobile radio network. Accordingly, the base stations "BTS", "NodeB" and "eNodeB", inter alia, based on the mobile radio technologies of the second mobile radio generation, including GSM, GPRS, EDGE, of the third mobile radio generation 3G or UMTS and of the fourth mobile radio generation LTE or LTE-A, which are standardized by standardization organization 3GPP, are mobile radio base stations within the context of the invention.

A "signal" within the context of the invention is intended to be understood to mean a physical magnitude that can involve one or more parameters of the magnitude defining, presenting and transmitting information about at least one variable magnitude. In particular, electrical signals of any type, above all even radio signals as are used in a mobile radio network, are "signals" within the context of the invention. They can particularly also be used for transmitting information and data.

The first aspect of the invention advantageously allows an object, particularly a vehicle, to be monitored using one or more mobile radio base stations of a mobile radio network on the basis of the physical position or change of position of the object and particularly on the basis of a predetermined criterion therefor. If the position or change of position satisfies the predetermined criterion in this case, a corresponding predetermined signal can be output that can be received on the object by the network access device thereof and can be used there by the control device for control and regulation of a function associated with the signal, particularly for triggering or termination. This advantageously allows the use of local computation and data processing capacities, which are possibly already present in the mobile radio base station, for vehicle monitoring.

This can result in a series of further advantages. In particular, this can result in no data or at least only small volumes of data needing to be transmitted to a remote data processing unit (back end), processing the position data, via the mobile radio network and possibly further communication networks linked thereto. Accordingly, the volume of data to be transmitted via the mobile radio network and the communication networks can fall, which can result in avoidance of or a decrease in transmission costs, a latency reduction and an improvement in what is known as the quality of service (QoS) for the mobile radio network as a whole, if need be for the further communication networks and particularly for the object monitoring itself. In particular, it is therefore also possible for communication data that are transmitted to the mobile radio base station anyway as part of the mobile radio connection of a vehicle via its network access device to be used for vehicle monitoring.

As a consequence, it is also possible to increase the security of the monitoring, since fewer or no data need to be routed through the communication networks, where they could possibly be exposed to security-relevant attacks, particularly by what are known as "man-in-the-middle" attacks. It is also possible to hamper unauthorized surmounting or suppression of the monitoring by manipulations on the object. If the object is a vehicle, there can be greater difficulty in influencing or bypassing the monitoring, even in the case of manipulation of sensors or key radio installations of the vehicle. This advantage can preferably be used for improved monitoring against theft. It is also possible for the standby time of the vehicle to be increased, since neither sensors nor key radio systems need to be supplied with power, particularly from the vehicle battery, during the monitoring in order to ensure monitoring of the vehicle position.

Described below are preferred embodiments and developments of the method that can each, unless expressly ruled out here, be combined with one another and with the other aspects of the invention described below as desired.

According to one preferred embodiment, the object is a vehicle, particularly an automobile, a truck, a motorcycle, a bus, a bicycle or a trailer for one of the vehicles cited above.

According to a further preferred embodiment, the object is a piece of luggage having an integrated network access device, particularly a suitcase, a bag or a rucksack. This allows particularly theft monitoring not only for a vehicle but also or instead for pieces of luggage that could be removed from a, for example, parked vehicle.

According to a further preferred embodiment, the first data already includes at least one position coordinate for the object itself. In particular, this data could have been determined on the object by a satellite navigation system.

According to a further preferred embodiment, the first data includes information that is sent from the first network access device to the at least one mobile radio base station in order to set up or maintain the communication link between the two. When the physical position or change of position of the object is detected, the position or change of position can then be derived or computed, at least coarsely, from this information. In particular, at least some of this information can relate to parameters of the radio link to the at least one mobile radio base station that are detected by the first network access device, preferably to the signal strength of radio signals from the at least one mobile radio base station that is received on the first network access device and/or to other parameters of this radio link. In this case, one such other parameter may be particularly a parameter or measured value that characterizes the time delay between the sending and receiving of a signal, i.e., the signal publication time, between the mobile radio base station and the first network access device. Particularly in the case of GSM-based mobile radio networks (but also in the case of LTE networks), this may be at least one "timing advance (TA)" parameter defined therein.

According to a further preferred embodiment, a predetermined second network access device for the mobile radio network has a communication link to at least one of the mobile radio base stations, and the method has the following further steps:

(S1b) receiving second data from the second network access device by the at least one mobile radio base station and (S2b) detecting a physical position or of a physical change of position of the second network access device on the basis of the second data.

In this case, the checking of the detected position or change of position in step S3 comprises checking of the detected positions or changes of positions of the first and second network access devices to determine whether they jointly satisfy a predetermined criterion. If this is the case, the predetermined signal is output in step S4. Preferably, step S2b is carried out by the at least one mobile radio base station in this case, which has a communication link to the second network access device.

This embodiment allows not just monitoring of a single object for its position or change of position but also identification of a relative approach by a predetermined second network access device, particularly a mobile telephone or a second vehicle, to the first vehicle, or vice versa. If the predetermined criterion is then satisfied by the positions or changes of position of both network access devices jointly, then a corresponding predetermined signal is in turn output. In this case, this signal can be sent particularly to the monitored object or to the second network access device so as therein to control or regulate, particularly to activate or deactivate, the functionality associated with the signal.

Preferably, this embodiment can also be used to monitor an area that is defined by the cells of one or more mobile radio base stations, with the first network access device being situated within this area To this end, a plurality of, but preferably all of the, network access devices that are already situated in the target area or move into it and have or take up a communication link to at least one of the mobile radio base stations are checked to determine whether they are each a second predetermined network device in the aforementioned sense. The predetermined criterion may then be simply the presence of the relevant predetermined second network access device in the target area, or else comprise one or more additional single criteria. The signal triggered when the predetermined criterion is satisfied may be configured particularly such that one or more particular, preconfigured actions are triggered on at least one device that receives the signal and that does not need to be the monitored object or the (first) network access device thereof itself. Actions that may be preferred include: counting of the frequency or density of second network access devices, particularly those of vehicles, in the target area; activation of functions in a building in the target area, particularly for heating or cooling, a lighting system or a signaling installation, a gate or a barrier in or on the building or on the premises thereof or a path thereto; or activation of any other events, including activities in social media (e.g., tweets, emails, SMS, etc.).

According to a first variant of this embodiment, the or each second network access device is identified to the at least one mobile radio base station that has a communication link to the first network access device, and in this way predetermined. This can be accomplished particularly by a one-time identification message that is received from the first network access device or the second network access device on one of the mobile radio base stations of the mobile radio network.

According to further variants of this embodiment, the one or each predetermined second network access device may be any network access device from a predetermined group of network access devices. In this case, the group may be defined particularly in a positive manner, i.e., by a "whitelist" of permitted network access devices, or in a negative manner by exclusion of all other network access devices, i.e., those banned by a "blacklist". In particular, the whitelist may be stipulated such that it comprises all of the network access devices without restriction, or, synonymously, the blacklist may be empty.

According to a further preferred embodiment, the mobile radio network is a cellular mobile radio network and the detection of the physical position or change of position of a network access device comprises detection of a cell change. "handover", for the relevant network access device. Preferably, this detection of the position or change of position is effected by one or more of the mobile radio base stations themselves. In a cellular mobile radio network, the individual mobile radio base stations each define the cells of the mobile radio network. If a network access device now moves within the cellular mobile radio network and in so doing leaves the transmission region (cell) covered by a first mobile radio base station and enters the transmission region of an adjacent second mobile radio base station, and in the process the radio link initially existing to the first mobile radio base station is replaced by a new radio link to the second mobile radio base station, this is referred to as a "cell change" or "handover". Since the mobile radio base stations are thus involved in such a cell change, the relevant mobile radio base stations have information, i.e. data, available about which network access devices have left the cell associated with the respective base station or have changed thereto. From the knowledge of the physical position and spread of the cell, it is therefore possible to at least coarsely determine the whereabouts of a network access device, with the accuracy influenced by the cell size. Specifically in urban areas, the cell sizes are usually very small, which means that, particularly in those areas, it is possible for the network access devices to be located relatively well solely on the basis of the instantaneous association between the network access devices registered in the mobile radio network and the corresponding mobile radio base stations. This can have the advantage that no further information, particularly from additional position finding systems such as satellite navigation, is required in order to determine the positions or changes of position of network access devices, particularly of the network access device of a vehicle, and to implement the monitoring on the basis thereof.

According to a variant of this embodiment, the mobile radio network is a mobile radio network based on the LTE standard that accordingly, as defined in this standard, has a mobility management entity (MME). In this case, the MME is prompted by a tracking area update to notify at least one of the mobile radio base stations that have a communication link to the network access device of the object and also possibly one or more further data processing devices (backends) involved in the monitoring of the object. If necessary, it does this by forming paging beforehand on instruction by at least one of the mobile radio bases stations or on the basis of an instruction from another entity in the mobile radio network, in order to establish the present tracking area of the network access device of the object. Within the context of the LTE standard, the term used in this context, particularly in that case, is a tracking area update if a network access device (in this case the one belonging to the object, particularly a vehicle) is in what is known as LTE_IDLE mode and, on the basis of a movement by the network access device, a cell change is made to a cell that belongs to a different tracking area than the cell in which the network access device is presently registered.

According to a further preferred embodiment, the detection of the physical position or change of position of a network access device comprises repeated sending of a paging signal by at least one of the mobile radio base station to the network access device of the object and also a check to determine whether, in response to the paging signal, a corresponding response signal therefor has been received from the network access device of the object via the communication link. If this is the case, the presence of the object in the cell belonging to the relevant mobile radio base station, and hence no change of position, is therefore established. If, by contrast, at least repeatedly, no response signal coming from the network access device of the monitored object is received, then this is rated as satisfaction of the predetermined criterion, and the predetermined signal is triggered. Preferably, the check for reception of a response signal and possibly the triggering of the signal are also carried out by the at least one mobile radio base station.

According to a further preferred embodiment, the predetermined criterion comprises one of the following criteria (a) to (f) or a combination thereof:

(a) any absolute change in the detected position of the first network access device;

(b) any absolute change in the detected position of the first network access device by a predetermined minimum distance or more;

(c) a cell change for the first network access device:

(d) a cell change for the first network access device that has not been authorized in advance:

(e) unauthorized termination of the communication link by the first network access device:

(f) if registration of a second network access device in the mobile radio network is being effected or has already been effected:

(f1) a shortfall below a predetermined minimum distance between the detected positions of the first and second network access devices; or (f2) a cell change for the second network access device from another mobile radio cell of the mobile radio network to the same mobile radio cell that also contains the first network access device.

According to a preferred variant in which the aforementioned criterion (f1) is used, in addition to the current distance between the detected positions of the first and second network access devices, the anticipated evolution of the distance between the two is also assessed, preferably by at least one of the mobile radio base stations. This can be accomplished particularly on the basis of preceding distance determinations for the previous course of the approach. In this way, an optimized configuration for the signal can be achieved. In particular, if the monitored object is a vehicle, it is possible for preconditioning of the vehicle, for example an air conditioning function, to be controlled or regulated even more accurately and earlier. This may be advantageous particularly for functions with an increased time requirement, for example for heating or cooling functions, and when the second network access device approaches quickly.

In this way, the predetermined criterion can be adjusted to suit the respective demands of the desired object monitoring in a flexible and versatile manner by appropriate selection or combination of single criteria.

According to a further preferred embodiment, the method additionally has the further steps of establishing whether deactivation of the first network access device or deregistration thereof from the mobile radio network is being initiated or has already been effected, and, if this is the case, of triggering the predetermined signal. This allows the object monitoring to also involve instances of unauthorized manipulation, deactivation or even destruction of the network access device of the object being identified and the predetermined signal being triggered in this case too. Particularly in the case of theft or unauthorized manipulation of the object, particularly a vehicle, the signal can then be used for alerting, for example of the object owner or of the vehicle keeper, of a security or guard service or the police, and hence preferably addressed to network access devices of the relevant receivers.

According to a further preferred embodiment, the predetermined signal comprises at least a signal that is used to send to a predetermined network access device, via the mobile radio network, information for output on a user interface that is integrated with or connected to said network access device.

A "user interface" within the context of the invention is in this case intended to be understood to mean a device that allows a user to passively or actively interact with a device or a machine. In particular, audible tone generators, visible displays of any type, such as screens, touch-sensitive surfaces and "touchscreens", vibration mechanisms, input and pointing devices, are user interfaces within the context of the invention.

According to a further preferred embodiment, the first network access device is integrated in a vehicle or connected thereto via a data link, which may particularly be a wired or optical data link or short-range radio data link (e.g. by Bluetooth), and the predetermined signal comprises at least a signal that is used to send to the first network access device, via the communication link, signaling for the control or regulation of one or more functions of the vehicle. In this case, according to different variants of this embodiment, the signaling may be configured to control or regulate, particularly activate or deactivate, one of the following functions of the vehicle, or a combination thereof:

interruption or limitation of the readiness of the vehicle for driving;

detection of the position or of a state of the vehicle and sending of the position or of information about the state via a communication link, particularly via the mobile radio network;

a function of an alarm installation;

output of a report on a user interface of the vehicle or the first network access device;

output of an audible effect;

an air conditioning function, particularly a (vehicle) heating function, a window defrost function, a cooling function, an automatic air conditioning system, or a humidity regulation function;

operation of illuminants;

a function of a locking installation;

a setting or adjustment for at least one seat or at least one mirror;

a function of an information or entertainment system;

a function of a sliding roof or convertible roof.

In this way, it is possible to take the information transmitted by the signal as a basis for controlling or regulating, particularly activating or deactivating, or otherwise influencing, a multiplicity of different actions and functionalities of the vehicle. In a preferred instance of application, this can be used to activate, control or regulate functions of a vehicle that the vehicle uses to "draw attention" to itself in order to attract the attention of passers-by, particularly by acoustic or lighting effects, opening of the convertible roof or displaying information on a display device. This can be used particularly for alerting or else even for advertising purposes. Preferably, the mobile radio network, particularly at least one mobile radio base station that has a communication link to the vehicle that is to be monitored, detects whether and preferably how many further network access devices, particularly mobile telephones, are situated in proximity to the vehicle, with the first network access device. On the basis of the result of this understanding, the predetermined signal can then be configured and sent to the first network access device for the purpose of controlling or regulating particular vehicle functions.

According to a further preferred embodiment, the interchange of the first data between the first network access device and at least one mobile radio base station of the mobile radio network is effected repeatedly while the communication link exists between at least one of the mobile radio base stations and the first network access device. This allows continuous monitoring of the object to be implemented, in which not only one-time monitoring at a single time but rather monitoring at a plurality of times, particularly regular intervals of time, the length of which may be adjustable, is effected. If the period between two successive times at which the first data are interchanged is chosen to be very short in this case, preferably in the region of minutes or even seconds, then essentially uninterrupted monitoring can be implemented. On the other hand, if it comes down to implementing the monitoring in as resource-saving a manner as possible, so that the transmission capacity of the air interface between the network access device of the object and the mobile radio base station or the mobile radio base stations and also the computation or processing capacity thereof provided for the monitoring can be burdened by the monitoring only to a small extent, then the corresponding period can also be chosen to be longer, particularly on the basis of the monitoring scenario. This means that it is also possible to extend the standby time of objects having a battery supply, particularly of parked vehicles, since the power consumption that is required for the communication link between the network access device of the object and the mobile radio station(s), and that normally needs to be supplied from the battery, is reduced.

According to a further preferred embodiment, the first network access device is integrated in a vehicle or connected thereto via a data link and the sequence of the method is triggered by parking of the vehicle. In this way, the vehicle itself can, particularly on the basis of switching-off of the vehicle drive and, in the case of internal combustion engines, particularly of the ignition, automatically identify whether and when the monitoring is meant to be activated, without this requiring further interaction with the vehicle user. Additionally or alternatively, parking can also be identified from locking of a locking installation of the vehicle. Hence, it is also possible to increase the security of the monitoring to the effect that the automatic triggering cannot, during correct operation, result in any lapse in the monitoring on account of absent or incorrectly performed manual activation by the vehicle user.

Furthermore, in one variant of this embodiment, it is additionally or alternatively also possible to provide the option of triggering the sequence of the method manually. Such manual triggering can be triggered particularly by a user interface on the vehicle itself or else via a network access device, which is independent thereof, that belongs particularly to a mobile telephone or to a preferably portable computer. An advantage of manual activation may be that it can be triggered even when the vehicle has not yet been parked or has been triggered on the basis of automatic activation based on other criteria.

The triggering of the monitoring is then transmitted to at least one of the mobile radio base stations, as relevant notification, by the network access device of the vehicle via a communication link that already exists or that needs to be set up afresh.

According to a further preferred embodiment, the method for monitoring an object is terminated when the at least one mobile radio base station that has a communication link to the first network access device receives from the first network access device a corresponding notification to terminate the monitoring.

According to a further preferred embodiment, the method is carried out by at least one mobile radio base station of the mobile radio network and a separate data processing device, which may be a server, in particular, which has a communication link to the mobile radio base station, jointly, with at least one of steps S2$a$, S2$b$, S3 and S4 being carried out by the data processing device. In this way, the method steps can be split over the mobile radio base station and a further data processing device in optimum fashion. This can be accomplished particularly even dynamically, preferably on the basis of the computation and processing capacities that are currently available on the mobile radio base station. Furthermore, this also allows complex evaluation and control or regulation steps to be relocated from the mobile radio base station to the additional data processing device, and just one or some of the steps to be performed by the mobile radio base station. This means that it is firstly possible for centralization of such steps to be implemented in just one or a few data processing devices, so that the processing of the relevant method steps does not have to be provided in each of the multiplicity of mobile radio base stations in a typical mobile radio network. It is also possible for the servicing of software used for performing the method, by bug fixing or updates and upgrades, to be accomplished in this manner by much easier access to the separate data processing device, and with lower maintenance complexity, in comparison with mobile radio base stations distributed in the field. This also allows the implementation of better protection for the monitoring functionality, since the separate data processing devices can be provided in a manner physically separate from the base stations in the field, for example in a computer center, where they can be well protected against unauthorized access.

In a variant of this embodiment, at least one of the mobile radio base stations, during or after the activation of the object monitoring on the object, particularly a vehicle, uses the communication link that already exists or that is to be set up for this purpose between the object and the mobile radio base station to receive from the first network access device the notification that the mobile radio network will be used to perform object monitoring. This notification is also transmitted to the data processing device via the communication link between the mobile radio base station and the data processing device, which is preferably effected via the mobile radio network. In this case, it is particularly also possible for an identifier for the mobile radio base station to be transmitted as well. This allows the accomplishment of simple and prompt activation of the object monitoring when a separate data processing device (backend) of this kind is used to perform the method.

A second aspect of the invention relates to a mobile radio base station having a mobile radio interface for sending and receiving radio signals via a mobile radio network. The mobile radio base station furthermore has one or more microprocessors, a memory and one or more programs that are stored in the memory. When executed on the one or more microprocessors, the program or the programs prompts or prompt the mobile radio base station to carry out a method according to the first aspect of the invention, at any rate such method steps as accordingly need to be carried out by a mobile radio base station.

A "mobile radio interface" within the context of the invention is in this case intended to be understood to mean the air interface of a mobile radio base station that the mobile radio base station can use to send or receive radio signals via a mobile radio network. In particular, a mobile radio interface may, inter alia, regularly have one or more antennas, radio signal amplifiers and RF transceivers on the input side and/or the output side or separate transmitter and receiver circuits and also a digital circuit, particularly for data processing in baseband.

According to a preferred embodiment, the one or more microprocessors and the memory are embodied separately from the mobile radio interface, particularly accommodated in a separate module of the mobile radio base station (edge computing unit). This allows the accomplishment of a particularly fast and uncomplicated, maintenance-friendly upgrade for already existing mobile radio base stations to allow them to carry out the method according to the first aspect of the invention.

A third aspect of the invention relates to a monitoring device for an object, particularly for a vehicle, that has a network access device for a mobile radio network and a control device connected thereto via a signal link. In this case, the network access device is in a form such that, when it has a communication link to the mobile radio network, it sends data to at least one mobile radio base station of the mobile radio network, which data can be used to identify a physical position or a physical change of position of the vehicle. In this case, the control device is in a form, and coupled to the network access device, such that it can process signals received via the network access device, and, during the processing of a corresponding signal received via the network access device, controls or regulates, particularly activates or deactivates, one or more functions of the object that are associated with the signal. Preferably, the monitoring device is integrated in a vehicle.

A "control device" within the context of the invention is intended to be understood to mean a device, particularly an electronic circuit or an appropriately programmed microprocessor or microcontroller, in an object, which device can control or regulate, particularly trigger or activate or deactivate, one or more functions of the object on the basis of an input signal received via a signal link.

According to one preferred embodiment of the monitoring device, the first network access device is integrated in the control device in this case, said control device being able to be embodied particularly as a module of the object. This allows the accomplishment of a particularly compact and, particularly on account of the omission of a module-external data link between the two, reliable combination of the control function and the network access device.

According to a further preferred embodiment, the object is a vehicle and the monitoring device is embodied such that when the vehicle is parked, said monitoring device uses the first network access device to send a notification to the mobile radio network that triggers the method according to the first aspect of the invention. In this case, said notification can be triggered particularly by locking of a locking installation of the vehicle or by virtue of an appropriate input on a user interface of the vehicle, which user interface may be subject to an access control, in particular.

In a preferred variant of this embodiment, a separate data processing device is, as described above, involved in the monitoring and the notification sent by the first network access device to trigger the monitoring includes an identifier for at least one of the mobile radio base stations to which the first network access device has a communication link. In this way, the separate data processing device can, when the notification is forwarded thereto, be informed about the identity of the mobile radio base stations involved in the monitoring, so that it is possible to speed up and simplify the beginning of interaction between the separate data processing device and at least one of the mobile radio base stations for the purpose of monitoring.

In a further preferred variant of this embodiment, the monitoring device, particularly the control device thereof, is configured such that it activates an alarm installation of the vehicle when the vehicle is parked.

According to a further preferred variant of this embodiment, the monitoring device, particularly the control device thereof, is configured such that it activates an energy-saving function of the vehicle when the vehicle is parked, which energy saving function involves a vehicle onboard power supply system being run down in order to save power. In this case, it is also preferably possible to run down the control device with the exception of the first network access device. Particularly preferably, the first network access device changes to a power-saving "no-load (e.g. IDLE)" mode in this case, however, in which the communication link to the mobile ratio network is now maintained only to a restricted degree and to the extent that the desired monitoring function can be performed.

According to a further preferred embodiment, the object is a vehicle and the functions of the vehicle that are controllable or regulatable by the monitoring device on the basis of an appropriate predetermined signal received on the monitoring device comprise one or more of the following functions or at least a combination thereof:

output of a warning signal that addresses at least one human sense; sending of a signal by the first network access device, which signal is used to send information denoting a technical state of the vehicle to at least one mobile radio base station, or additionally to one or more network access devices, via the mobile radio network; interruption or limitation of the readiness of the vehicle for driving; detection of the position or of a state of the vehicle and sending of the position or of information about the state via a communication link, particularly via the mobile radio network; a function of an alarm installation; output of a report on a user interface of the vehicle or the first network access device; output of an audible effect; an air conditioning function; operation of illuminants; a function of a locking installation; a setting or adjustment for at least one seat or at least one mirror; a function of an information or entertainment system; a function of a sliding roof or convertible roof.

A fourth aspect of the invention relates to a computer program product that contains instructions that, when executed on one or more processors of at least one mobile radio base station according to the second aspect of the invention or a combination of at least one mobile radio base station and at least one separate data processing device having a data link thereto, prompt this mobile radio base station or this combination to carry out the method according to the first aspect of the invention. In this case, the computer program product may be particularly a computer-readable storage medium on which the instructions are stored. Alternatively, the computer program product may be in the form of a file that is downloadable from a server.

Yet a further aspect of the object monitoring described here relates to a vehicle, particularly a motor vehicle, that has a monitoring device according to the third aspect of the invention.

Yet a further aspect of the object monitoring described here relates to a network access device, particularly a mobile radio or a computer having a mobile radio modem, that is configured or programmed such that it can carry out the function of a second network access device within the context of the invention. In particular, it is accordingly capable of having a communication link to the mobile radio network and of sending (second) data to at least one mobile radio base station of the mobile radio network to said mobile radio base station, on the basis of which a physical position or a physical change of position of the (second) network access device can be detected. Furthermore, it may accordingly be capable of using the communication link to receive information and particularly at least one predetermined signal and to control or regulate, particularly to activate or deactivate, a functionality of the network access device that is associated with the signal. The configuration or programming of the network access device can be effected particularly by means of what is known as an "application (app)" that provides the user of the network access device with information via a user interface. Such information can relate particularly to the physical position or changes of position, properties or attributes connected thereto, or technical states of the monitored object. This can be used particularly in order to provide information about the physical proximity or properties or states (e.g. vehicle type, equipment, tank fill, remaining range), etc. of a car sharing vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
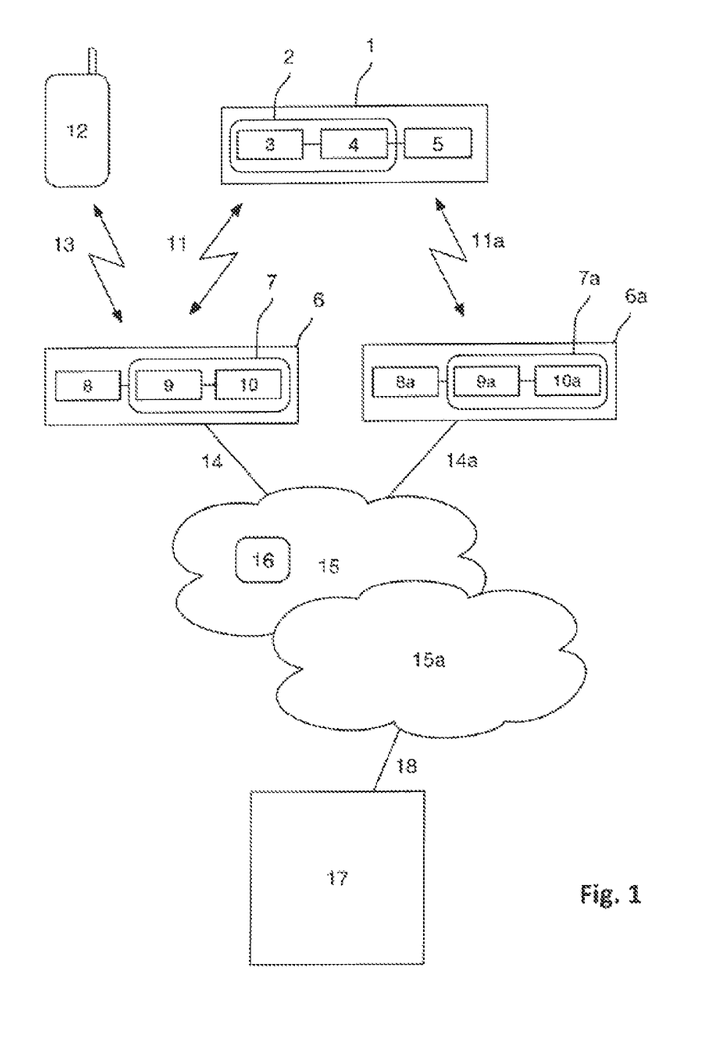
FIG. 1 schematically shows an object monitoring system according to a preferred embodiment of the invention.

FIG. 1 shows a system for monitoring an object 1 by a mobile radio network. In this case, the object 1 to be monitored has a monitoring device 2 that in turn incorporates a control device 3 and also a first network access device 4, which have a data link to one another. In addition, the object 1 has a position finding system 5, which may be satellite-based (preferably a GPS system). The object 1 has a communication link 11, 11a to one or more mobile radio base stations 6, 6a of the mobile radio network (only two of the mobile radio base stations are shown in FIG. 1) via the first network access device 4.

The mobile radio base stations 6, 6a each have an edge computing unit 7, 7a that in turn has one or more microprocessors 9, 9a and also a memory 10, 10a, preferably one or more semiconductor memory chips. The memory stores one or more programs at a time for performing an object monitoring method according to the invention, at any rate method steps that are to be carried out by the mobile radio base station(s) in this case.

A second network access device 12, which may be particularly a mobile telephone, preferably a smart phone, or a portable computer, particularly a tablet computer, having a mobile radio modem, has a communication link 13 to at least one of the mobile radio base stations 6, 6a.

Each of the mobile radio base stations 6, 6a is connected, via a communication link 14, 14a, to a core network 15 of the mobile radio network, which preferably has a communication link to one or more further communication networks 15a. The mobile radio network, particularly the core network 15 thereof, may have particularly a mobility management unit 16, particularly a "mobility management entity" (MME) based on the LTE standard. A separate data processing device 17 (back end) has a direct or indirect communication link 18, particularly a data link, to the core network 15 via one or more further communication networks 15a.

Figure 2:
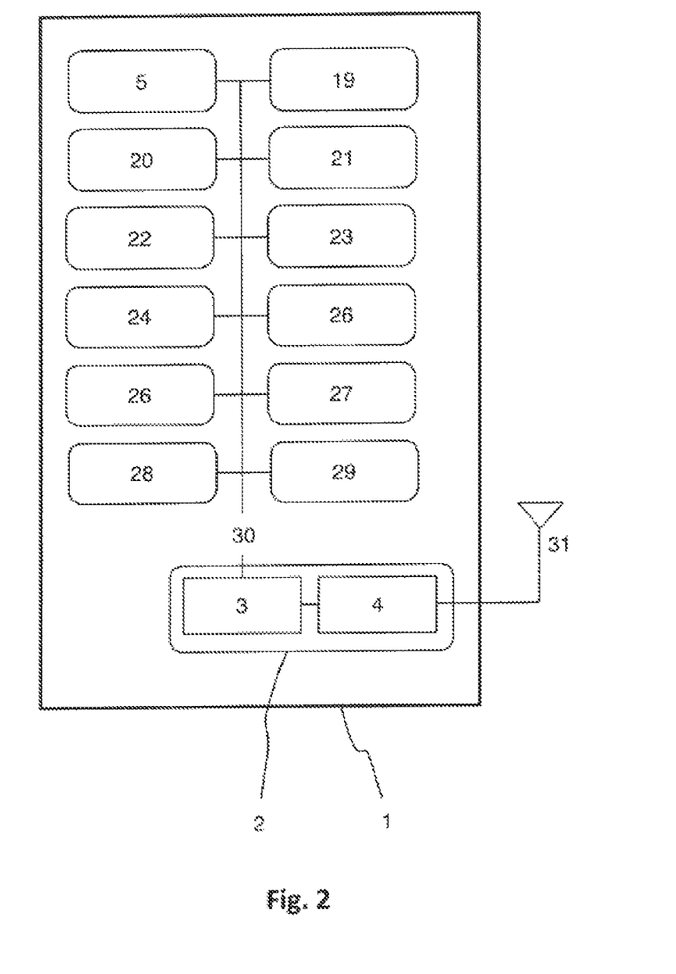
FIG. 2 schematically shows a vehicle with a monitoring device according to a preferred embodiment of the invention.

FIG. 2 schematically shows, as an example of an object to be monitored, a vehicle 1 having a monitoring device 2 according to a preferred embodiment of the invention. In this case, the monitoring device 2 has a control device 3, particularly a telematic control device of the vehicle, and also a first network access device 4 that can have a communication link to at least one mobile radio base station 6, 6a via an antenna 31. In this case, the control device 3 is connected to a vehicle bus system 30, which may be particularly a standardized CAN bus system, and can use said vehicle bus system to transmit commands to one or more vehicle components, which are likewise connected to the vehicle bus system 30, in order to control or regulate, particularly activate or deactivate, said vehicle components. Such vehicle components may be particularly: a component 5 for detecting the position of the vehicle 1, a component 19 for detecting a technical state of the vehicle 1, a component 20 for interrupting or limiting the readiness of the vehicle 1 for driving, particularly an engine immobilizer, an alarm installation 21, a user interface 22, a tone generator 23, particularly a loudspeaker or loudspeaker system, an air conditioning installation 24, particularly a heating system, a cooling system or a window defrosting device, an illuminant 25, a locking installation 26, an adjustable seat or mirror 27, an information or entertainment system 28 or an adjustable vehicle roof 29, particularly a sliding roof or a convertible roof.

Figure 3:
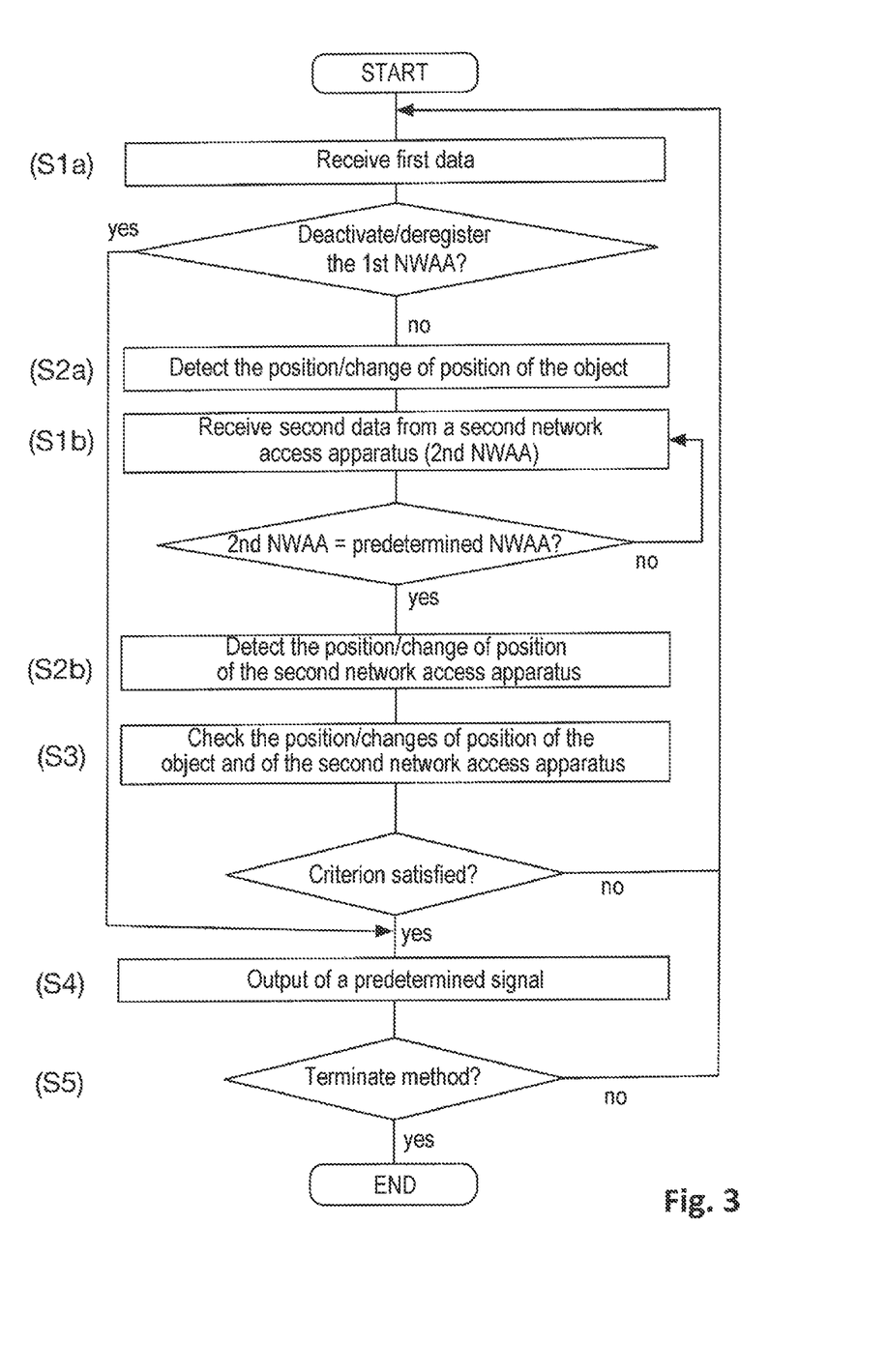
FIG. 3 shows a flowchart to illustrate a preferred embodiment of the method according to the invention.

FIG. 3 shows a flowchart to illustrate a preferred embodiment of the monitoring method. In this case, the method is started when a mobile radio base station receives a corresponding notification from the object to be monitored (START). If the object is particularly a vehicle, then the notification can be triggered by parking of the vehicle. In a first step S1a, at least one of the mobile radio base stations 6, 6a of a mobile radio network receives first data from a network access device 4 of the object 1 to be monitored. Subsequently (optionally even beforehand), it is optionally possible for a check to take place to determine whether the first network access device has been deactivated or deregistered from the network without authorization. This is particularly the case when the communication link between the first network access device and the mobile radio base station has been interrupted or terminated, in particular improperly. If the result of the check is that unauthorized deactivation or deregistration of this kind has taken place, then a corresponding predetermined signal is output in a step S4. Otherwise, the method moves to a step S2a, in which the first data are taken as a basis for detecting the position or a change of position of the object 1. In a further step S1b, second data are received from a second network access device 12 via a communication link 13 between the second network access device 12 and at least one of the mobile radio base stations 6, 6a of the mobile radio network. On the basis of these second data, a check then takes place to determine whether the second network access device 12 is a predetermined network access device. In this case, the predetermination can comprise the selection of only a single network access device 12 or else of a group of determined network access devices 12. If the network access device from which the second data have been received is not an appropriately predetermined network access device 12, then the method returns to step S1b and waits there, if need be, until second data can be received from a further network access device. Otherwise, a step S2b involves detection of the position or a change of position of the predetermined second network access device 12. In a subsequent step S3, the position or changes of position of both the object 1 and the second network access device 12 are then checked jointly to determine whether they satisfy a predetermined criterion. This criterion can be applied both to the object 1 and to the second network access device 12 separately. Alternatively, the criterion may be defined such that it can be satisfied only by the positions or changes of positions of both the object 1 and the second network access device 12 jointly. If the check shows that the predetermined criterion is not satisfied, then the sequence of the method returns to its beginning. Alternatively, the return can also be made just to step S1b (not shown in FIG. 3). Otherwise, i.e. when the predetermined criterion has been satisfied, the method moves to a step S4 in which a predetermined signal associated with the criterion is output. This signal may be particularly a signal that is transmitted from one of the mobile radio base stations 6, 6a to the first network access device of the object 1 or to the or a second network access device 12 via the relevant communication link 11a, 11b or 13.

Subsequently, a check takes place to determine whether the monitoring method needs to be terminated. If this is not the case, then the method sequence returns to its beginning. Otherwise, the method is terminated.

While, as a preliminary measure, at least one exemplary embodiment has been described, it should be noted that a large number of variations exist therefor. In this case, it should also be noted that the exemplary embodiments described are only nonlimiting examples, and the intention is not to limit the scope, applicability or configuration of the devices and methods described in this case thereby. Rather, the preliminary description will provide a person skilled in the art with guidance for implementing at least one exemplary embodiment, it being self-evident that various changes in the manner of operation and the arrangement of the elements described in an exemplary embodiment can be made without departing from the subject matter defined in each of the appended claims and from the legal equivalents of said subject matter.

Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Object, particularly vehicle
2 Monitoring device
3 Control device
4 First network access device
5 Position finding system
6, 6a Mobile radio base stations
7, 7a Edge computing unit
8, 8a Mobile radio interface
9, 9a Microprocessor(s)
10, 10a Memory, one or more programs stored therein
11, 11a Communication link(s) between object and mobile radio base station(s)
12 Second network access device
13 Communication link(s) between second network access device and mobile radio base station(s)
14, 14a Communication link(s) between mobile radio base station and mobile radio core network
15 Mobile radio core network
15a Further communication network(s)
16 Mobility management unit, MME
17 Data processing device
18 Communication link between mobile radio network and data processing device
19 Component for detecting a technical state of the vehicle
20 Component for interrupting or limiting the readiness of the vehicle for driving, particularly engine immobilizer
21 Alarm installation
22 User interface
23 Tone generator, particularly loudspeaker (system)
24 Air conditioning installation
25 Illuminant
26 Locking installation
27 Adjustable seat or mirror
28 Information or entertainment system
29 Adjustable vehicle roof
30 Vehicle bus system
31 Antenna

What is claimed is:

1. A method for operating a mobile radio network, comprising the acts of:
receiving first data from a first network access device of an object via a first communications link by at least one mobile radio base station;
detecting, based on the first data, at least one of a physical position and a change of physical position of the first network access device;
checking whether the detected at least one of the physical position and the change of physical position satisfies a predetermined criterion; and
outputting a predetermined signal if the checking indicates that the predetermined criterion is satisfied,
wherein at least one of the detecting and checking is carried out by the at least one mobile radio base station, and
wherein the predetermined criterion includes at least one of: an absolute change in the detected physical position of the first network access device, a mobile radio network cell change for the first network access device, a mobile radio network cell change for the first network access device not authorized in advance, and unauthorized termination of the first communication link by the first network access device.

2. The method as claimed in claim 1, further comprising the acts of:
receiving second data from a second network access device via a second communications link by the at least one mobile radio base station; and
detecting, based on the second data, at least one of a physical position and a change of physical position of the second network access device,
wherein the detecting includes checking the detected physical positions or changes of physical positions of the first and second network access devices to determine whether they jointly satisfy the predetermined criterion.

3. The method as claimed in claim 2,
wherein the mobile radio network is a cellular mobile radio network, and
wherein detecting the at least one of the physical position or the change of physical position of at least one of the first network access device and the second network access device includes detecting a change in a mobile radio network cell associated with the at least one of the first network access device and the second network access device.

4. The method as claimed in claim 1, wherein the absolute change in the detected physical position of the first network access device is by a predetermined minimum distance, and wherein the mobile radio network cell change for the first network access device is not authorized in advance.

5. The method as claimed in claim 2, wherein the predetermined criterion includes at least one of:
a difference in the detected physical positions of the first and second network access devices being less than a predetermined minimum distance, and
a mobile radio network cell change for the second network access device from a mobile radio network cell different from the mobile radio network cell associated with the first network device to the mobile radio network cell associated with the first network access device.

6. The method as claimed in claim 4, further comprising the acts of:
determining whether deactivation or deregistration of the first network access device from the mobile radio network has been initiated or already effected,
wherein the predetermined criterion includes a determination that the deactivation or deregistration of the first network access device has been initiated or already effected.

7. The method as claimed in claim 1, wherein the predetermined signal includes a signal to initiate sending, via the mobile radio network, information for output on a user interface integrated with or connected to a predetermined network access device.

8. The method as claimed in claim 1,
wherein the first network access device is integrated in or connected to a vehicle via a vehicle data link, and
wherein the predetermined signal includes a signal to the first network access device to initiate sending, via the vehicle data link, information for the control of at least one vehicle function.

9. The method as claimed in claim 8, wherein the at least one vehicle function includes at least one of:
interruption or limitation of a readiness of the vehicle for driving;
determination of information associated with at least one of a vehicle position and a vehicle state the vehicle and transmission of said information to the at least one mobile radio base station via the communication link;
a function of an alarm installation;
output of a report on a user interface of the vehicle or the first network access device;
output of an audible effect;
a function of an air conditioning;
operation of illuminants;
a function of a locking installation;
a setting for at least one seat or at least one mirror;
a function of at least one of an information and an entertainment system;
a function of a sliding roof or convertible roof of the vehicle.

10. The method as claimed in claim 1, wherein interchange of the first data between the first network access device and the at least one mobile radio base station of the mobile radio network occurs repeatedly when the first network access device and the at least one mobile radio base station are in communication over the communication link.

11. The method as claimed in claim 1, wherein the first network access device is integrated in a vehicle or connected thereto via a vehicle data link, and the method is initiated by parking of the vehicle.

12. The method as claimed in claim 1,
wherein the at least one mobile radio base station of the mobile radio network is configured to be connected with a separate data processing device, and
wherein the at least one mobile radio base station and the separate data processing device are configured to jointly perform the method with at least one of the method acts being performed by the separate data processing device.

13. A mobile radio base station, comprising:
a mobile radio interface configured to send and receive signals via a mobile radio network;
at least one microprocessor;
a memory; and
at least one program stored in the memory, the at least one program being configured to be executed on the at least one microprocessor to initiate from the mobile radio base station the method as claimed in claim 1.

14. A monitoring device for an object, comprising:
a first network access device configured to communicate over a mobile radio network; and
a control device communicates with the first network access device via a signal link;
wherein the first network access device is configured to send first data associated with a physical position or a change of physical position of the object over the mobile radio network to at least one mobile radio base station of the mobile radio network, and
wherein the control device is configured to process signals received via the first network access device and control at least one function of the object in response to a determination, by the at least one mobile radio base station and based on the processed signals, that the physical position or the change of physical position indicates satisfaction of a predetermined criteria, the predetermined criteria including at least one of: an absolute change in the detected physical position of the first network access device, a mobile radio network cell change for the first network access device, a mobile radio network cell change for the first network access device not authorized in advance, and unauthorized termination of the first communication link by the first network access device.

15. The monitoring device as claimed in claim 14, wherein the object is a vehicle, and the at least one function is at least one of:
- an output of a warning signal detectable by at least one human sense,
- transmitting a signal by the first network access device to initiate transfer via the mobile radio network of information denoting a technical state of the vehicle to the at least one of the at least one mobile radio base station and one or more further network access devices,
- interruption or limitation of the readiness of the vehicle for driving;
- determination of information associated with at least one of a vehicle position and a vehicle state the vehicle and transmission of said information to the at least one mobile radio base station over the mobile radio network;
- a function of an alarm installation;
- output of a report on a user interface of the vehicle or the first network access device;
- output of an audible effect;
- a function of an air conditioning;
- operation of illuminants;
- a function of a locking installation;
- a setting for at least one seat or at least one mirror;
- a function of at least one of an information and an entertainment system;
- a function of a sliding roof or convertible roof of the vehicle.

* * * * *